United States Patent [19]

Sakshaug et al.

[11] 4,335,417

[45] Jun. 15, 1982

[54] HEAT SINK THERMAL TRANSFER SYSTEM FOR ZINC OXIDE VARISTORS

[75] Inventors: Eugene C. Sakshaug, Lanesborough; Earl W. Stetson, Pittsfield, both of Mass.

[73] Assignee: General Electric Company

[21] Appl. No.: 138,169

[22] Filed: Apr. 7, 1980

Related U.S. Application Data

[63] Continuation-in-part of Ser. No. 939,792, Sep. 5, 1978, abandoned.

[51] Int. Cl.[3] .............................................. H02H 3/22

[52] U.S. Cl. ..................................... 361/127; 338/21; 338/51

[58] Field of Search ............................ 338/51, 52, 21; 361/126, 127

[56] References Cited

U.S. PATENT DOCUMENTS

| | | | |
|---|---|---|---|
| 1,063,303 | 6/1913 | Thomson | 338/21 |
| 2,739,213 | 3/1956 | Beckjord | 338/51 X |
| 2,870,307 | 1/1959 | Milliken et al. | 338/21 |
| 4,092,694 | 5/1978 | Stetson | 361/127 X |
| 4,100,588 | 7/1978 | Kresge | 361/127 |

*Primary Examiner*—Harry E. Moose, Jr.
*Attorney, Agent, or Firm*—Robert A. Cahill

[57] ABSTRACT

A heat transfer arrangement for zinc oxide varistors comprises a metal heat sink disk held in contact with one face of the varistor by means of a circumferential elastic sleeve. The heat generated within the varistor rapidly conducts into and is absorbed by the metal disk and transmits through the elastic sleeve to the environment. When the varistor heat sink assembly is mounted within a surge voltage arrester, a flexible positioning member holds the assembly tightly against the arrester housing for transferring the heat to the housing.

6 Claims, 10 Drawing Figures

HEAT SINK THERMAL TRANSFER SYSTEM FOR ZINC OXIDE VARISTORS

This is a continuation-in-part of U.S. patent application Ser. No. 939,792 filed Sept. 5, 1978 and now abandoned.

BACKGROUND OF THE INVENTION

Zinc oxide varistors are employed in voltage surge arrester devices for shunting surge currents while maintaining the ability to operate under line voltage conditions. These varistors have a high exponent "n" in the voltage-current relationship $I=KV^n$ for a varistor, where I is the current through the varistors, K is a constant and V is the voltage across the varistor. High exponent zinc oxide compound varistors can have sufficient resistance at normal line voltage to limit the current through the varistor to a low value, but resistance at high currents is low so that the varistor voltage with surge current flowing is held to a level low enough to prevent damage to the insulation of the equipment being protected by the varistor.

Because the varistors are continuously connected from line-to-ground a continuous current flows through the varistor, and the current causes a small amount of power to be dissipated by the varistors at normal system voltage and at normal operating temperature. The magnitude of both the current and the resulting power dissipation increases as the varistor temperature increases. Some means must therefore be provided to remove heat from the varistor to prevent thermal runaway. The means must not only be capable of preventing thermal runaway under normal conditions, but it must also be capable of dissipating the heat resulting from high current surges. One effective means for removing the heat from the varistor bodies employs an aluminum oxide filled silicone resin. Each individual varistor disk is cast within a thick quantity of the resin material prior to insertion within the surge arrester housing. The thick silicone material carries heat away from the varistor to the walls of the surge arrester body. The use of a silicone encapsulant as a heat transfer means in zinc oxide varistors is described within U.S. Pat. No. 4,092,694 and 4,100,588.

The process of silicone encapsulation is extremely difficult to implement in a high production operation. Varistor disks are encapsulated within the silicone by means of a molding operation and individual varistor disks or a pair of disks must be inserted within a separate mold before the silicone encapsulant is added. After a sufficient quantity of time has lapsed for the silicone material to cure, the encapsulated disks must then be manually removed from the molds. The high material costs for the quantity of silicone material employed as well as the custom mold forming operation have made the use of zinc oxide varistors in surge arrester devices very expensive. One of the purposes of this invention is to provide zinc oxide varistors with an improved heat sink thermal transfer system at a greatly reduced manufacturing cost.

U.S. Pat. No. 2,870,307 (Milliken et al) describes an early method of providing a weatherproof resistor which is cooled by means of a plurality of thin plates made from aluminum or copper. Cooling air is freely circulated about the periphery of the plates during operation of the resistor.

The instant invention differs substantially from the device described within the aforementioned patent for the reason that the amount of heat required to be rapidly transferred away from a zinc oxide varistor disk is too large to be carried by the aluminum or copper plates. The mechanism of heat transfer required by the resistors described within the aforementioned patent is by the mechanism of radiation and convection into the surrounding air and is in effect, a steady state heat transfer system. The heat transfer mechanism proposed within the instant invention is a "heat sink" which rapidly absorbs heat and is, in effect, a transient responding system. The heat sink elements proposed within the instant invention can therefore have a diameter corresponding to the zinc oxide varistors employed whereas the radiating plates described within the patent to Milliken et al should be larger than the resistors to be cooled to provide a large radiating surface.

SUMMARY OF THE INVENTION

Zinc oxide varistor disks are fitted with a metal disk heat sink held in place by means of a flexible elastic sleeve. The heat sink varistor combination is held in thermal contact within the surge arrester body by means of a resilient positioning member and axially applied spring force. The metal disk rapidly removes and absorbs heat from the varistor body during surge conditions thereby limiting the varistor temperature rise and then transmits the heat to the arrester housing through the flexible elastic sleeve surrounding both the varistor body and the metal disk.

GENERAL DESCRIPTION OF THE PRIOR ART

Figure 1:
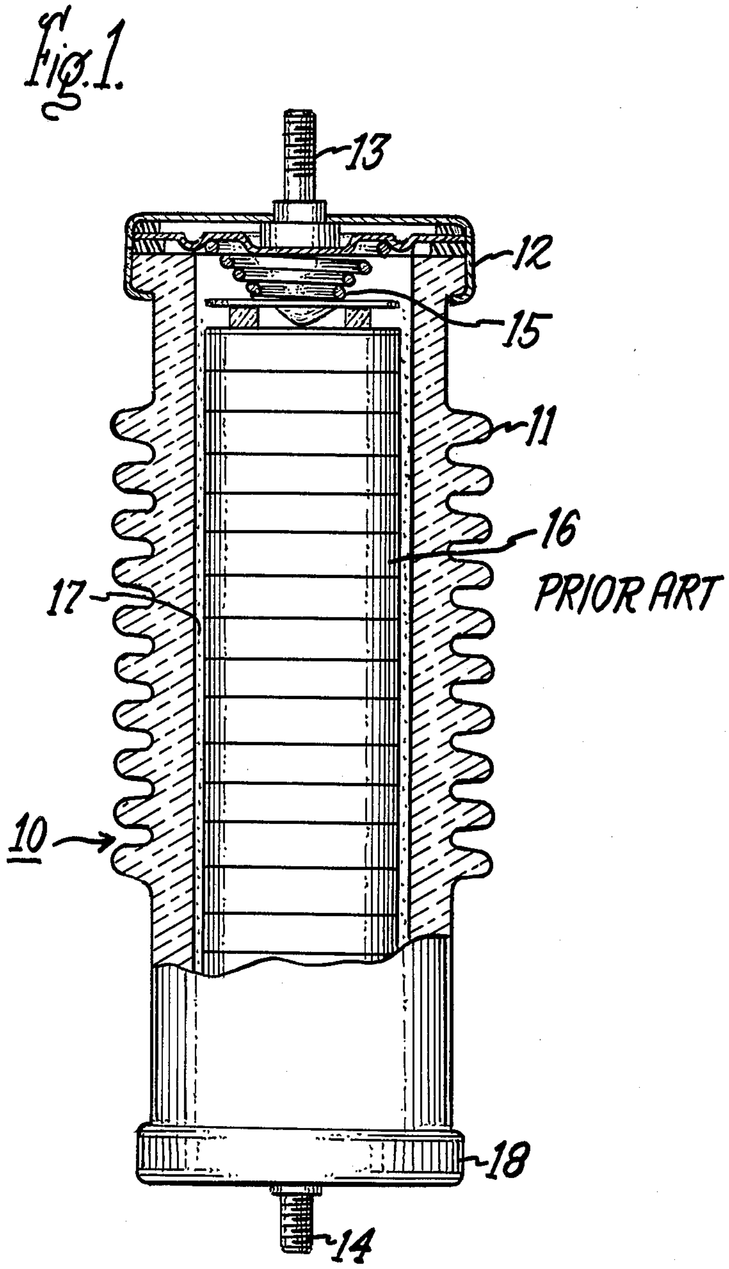
FIG. 1 is a sectional view of a prior art surge arrester containing a plurality of varistor disks.
Figure 2:
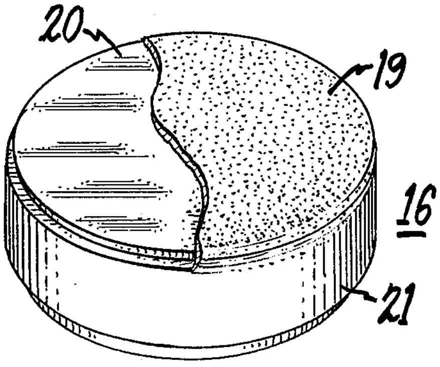
FIG. 2 is an enlarged top perspective view of the zinc oxide varistor disk of FIG. 1 in partial section.

FIG. 1 shows a typical surge arrester 10 of the type consisting of a porcelain housing 11 having a top end cap 12 and a top terminal 13 electrically connected to a plurality of zinc oxide varistors 16 by means of a spring 15. The arrester further contains a gas space 17 in order to provide for the release of gas in the event of varistor failure. The surge arrester is closed at the bottom by means of a bottom cap 18 and electrical connections to the bottom of the arrester are made by means of bottom terminal 14. The varistors used within the arrester are of the type consisting of a sintered disk of zinc oxide material 19 as shown in FIG. 2 and having an electrode layer 20 on the top and bottom faces.

The varistor is enclosed within a ceramic collar 21 in order to prevent a discharge from occurring between the electrode layers along the periphery of the varistor and bypassing the zinc oxide material.

The size and composition of the metal plates described within the aforementioned patent to Milliken et al would render such plates inadequate for heat sinking the heat energy requirement of zinc oxide varistors. A typical zinc oxide varistor weighs approximately 385 grams and has a specific heat of 0.14 cal/gm/°C. and a mass density of 5.63 grams per cubic centimeter. The thermal capacity is defined as the product of the specific heat times the mass density, and, for such a zinc oxide varistor, is, therefore 0.79 cal°per °C. per cubic centimeter.

The absorption properties of a heat sink device should therefore be of the same order as the thermal capacity of the zinc oxide disk in order to be effective for rapidly removing heat away from the disk and controlling the varistor temperature rise and power dissipation after surge current conduction. The specific heats of the materials disclosed within the device of Milliken et al, such as aluminum and copper, have values of 0.21 and 0.09 cal/gm/°C. respectively with mass density values of 2.70 and 8.92 gm/cc. The thermal capacity for aluminum is therefore 0.56 cal/°C./cc and 0.80 cal/°C./cc for copper.

DESCRIPTION OF THE EMBODIMENT

Figure 3:
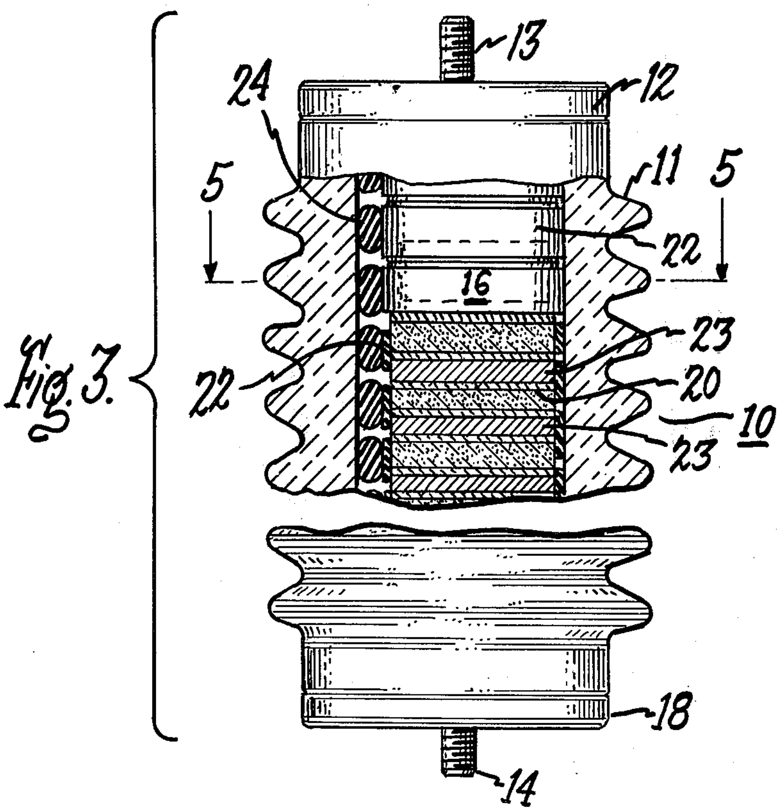
FIG. 3 is a front view in partial section of a surge arrester containing the heat sink transfer arrangement of the invention.

In order to transfer the heat generated within the varistor body during operation within a surge arrester device similar to the voltage surge arrester of FIG. 1, the heat transfer arrangement of FIG. 3 is employed. The arrester 10 of FIG. 3 is similar to that of FIG. 1 and like reference numerals will be used to describe similar elements. The heat sink disks 23 having a high thermal capacity and the varistors 16 are surrounded by flexible elastic sleeves 22, such that varistors are held in intimate thermal and electrical contact with each other and with the end caps by means of spring 15. The flexible elastic sleeve 22 is held in thermal contact with the porcelain housing 11 by means of a positioning member 24 which is inserted between the housing 11 and the heat transfer assembly consisting of elastic sleeve 22 and heat sink disk 23 on varistor 16. For the embodiment of FIG. 3, the heat sink disk 23 can consist of a high thermal capacity material such as steel having a specific heat of 0.12 cal/gm/°C. and a mass density of 7.86 gm/cc resulting in a thermal capacity of 0.94 cal/°C./cc. As described earlier, this thermal capacity should be of the same order as that of zinc oxide varistor 16 which was described earlier as comprising approximately 0.79 cal/°C./cc in order to provide effective heat sinking under surge current conditions.

Since the size of the heat sink is a critical factor to be considered with the heat sink transfer system of the invention, the heat sink volume must be at least 25% of the volume of the zinc oxide disk to be effective. The temperature of the zinc oxide disk rises directly with the amount of energy absorbed and inversely with combined masses of the zinc oxide disk and the heat sink. For example, a steel heat sink having a volume equivalent to that of the zinc oxide disk, the temperature rise would be less than 50% that of the zinc oxide disk alone. One other important factor to be considered is the cost of the material employed. Copper, for example, having a thermal capacity close to that of zinc oxide would be too expensive to be used within surge voltage arresters. Aluminum for example, would have to be exceedingly large in order to be effective in view of its low thermal capacity.

Figure 4:
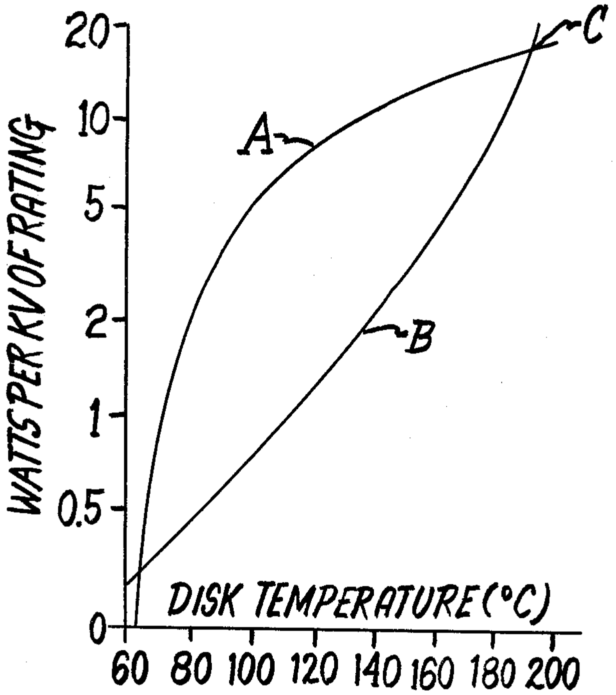
FIG. 4 is a graphic representation of the power dissipation capability of the surge arrester and the power dissipation of the zinc oxide varistor as a function of varistor temperature.
Figure 5:
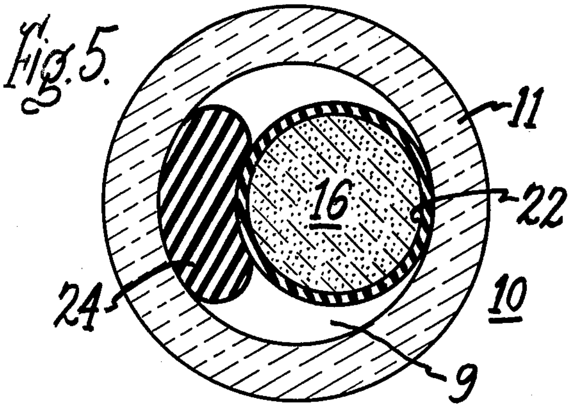
FIG. 5 is a sectional view of the surge arrester of FIG. 3 through plane 5—5.

As described earlier, surge current flow through a typical zinc oxide varistor causes the temperature of the varistor to rise directly with the amount of energy absorbed by the varistor and inversely with both the mass and the specific heat of the varistor. As the temperature of the varistor rises, the power dissipation of the varistor at normal voltage rises as shown in FIG. 4 wherein the thermal dissipation capability of the surge arrester A is compared to the varistor power dissipation per unit rating at operating voltage B. After the flow of a high surge current, the power dissipation requirement of the varistors can increase to such an extent that the power dissipation of the varistors B exceeds the heat dissipation capability of the surge arrester A as shown at C so that thermal runaway results. When the heat sink 23, held to the varistor by means of flexible elastic sleeve 22 as shown in the embodiment of FIG. 3, is employed, the temperature of the varistor rises directly with the amount of energy absorbed by the varistor and inversely with the combined masses and specific heats of both the varistor 16 and heat sink 23 because of the rapid flow of heat from the varistor into the heat sink and as shown earlier, the temperature rise of the varistor is now held to a sufficiently low level so that the varistor effectively cools to a normal operating temperature. The functional relationship between positioner 24 and varistor 16 is shown in FIG. 5 to include a gas space 9 to provide for gas expansion in the event of varistor failure. The heat sink thermal transfer arrangement of FIG. 3 can be seen in greater detail in FIGS. 6 and 8 wherein the varistor 16 having upper and lower electrode layers 20 on top and bottom surfaces of the zinc oxide material and a ceramic collar 21 around the periphery of the zinc oxide material further includes a metal disk 23 held in thermal contact with the varistor by means of elastic sleeve 22. The material selected for the elastic sleeve is a silicone resin having a high degree of flexibility and good heat conducting properties. As described earlier, metal disk 23 comprises a steel composition but other alloys of iron having a similar heat capacity can be employed.

Figure 6:
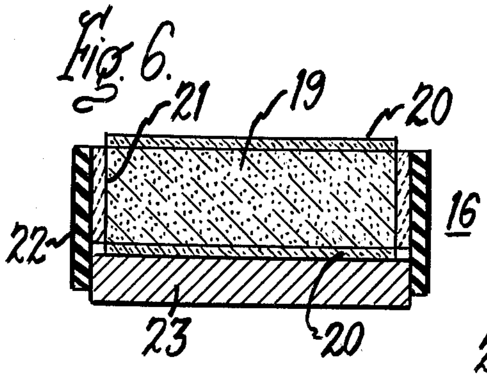
FIG. 6 is a side sectional view of the heat sink transfer arrangement according to the invention.
Figure 7:
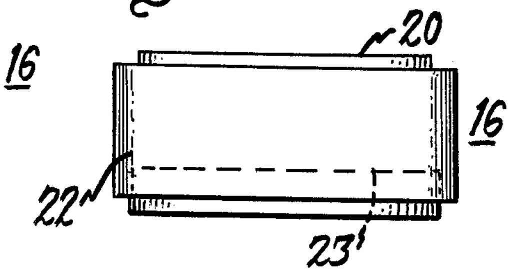
FIG. 7 is a side view of the heat sink thermal transfer arrangement of FIG. 6.

The heat sink thermal transfer arrangement of FIG. 6 is shown in FIG. 7 wherein the elastic sleeve 22 surrounds varistor 16 and heat sink 23. Electrical continuity is achieved between each varistor in a series arrangement of a plurality of varistors by means of the electrode layer 20 of one varistor and the metal disk 23 of the next succeeding varistor in the series. In some applications the ceramic collar 21 can be dispensed with and the elastic sleeve 22 provides electrical insulation between the electrode layers of the disk as well as holding the metal disk and varistor in good physical contact.

Figure 8:
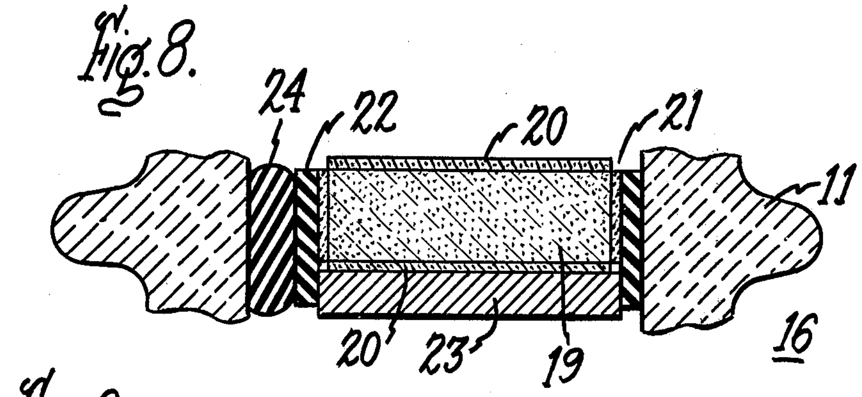
FIG. 8 is an enlarged cross sectional view of the heat sink thermal transfer arrangement of the varistors within the surge arrester of FIG. 3.

The positioning element 24 for holding the varistor and metal heat sink in thermal contact within the arrester of FIG. 3 is shown in greater detail in FIG. 8. Once the elastic sleeve 22 is fitted around the varistor and metal disk, the metal disk and varistor combination is inserted within the arrester housing. Positioning member 24 is then inserted to force the varistor assembly directly against the housing. The positioning element 24 can be conveniently manufactured from flexible polymer such as silicone resin or other good thermal conducting electrical insulating material.

Figure 9:
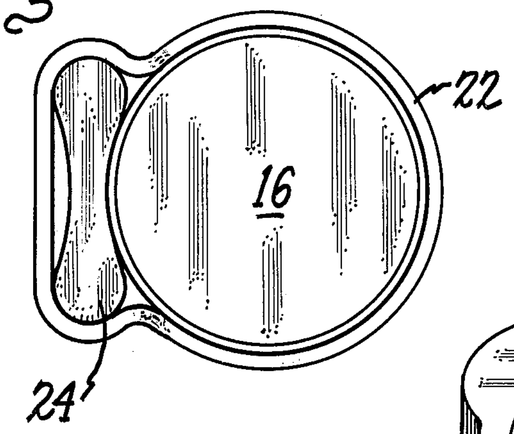
FIG. 9 is a top view of a further embodiment of the varistor heat sink thermal transfer arrangement of the invention.
Figure 10:
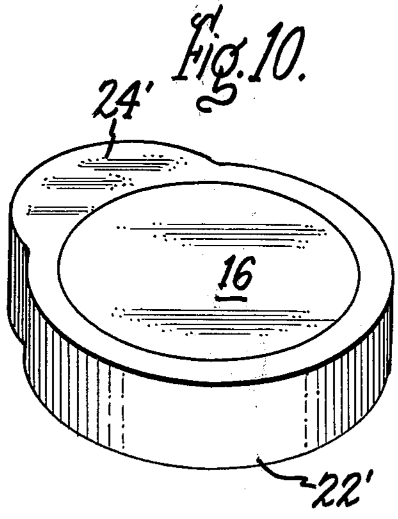
FIG. 10 is a top perspective view of another embodiment of the varistor heat sink thermal transfer arrangement of FIG. 9.

FIG. 9 shows elastic sleeve 22 and positioning member 24 wherein the positioning member is held between the varistor 16 and the sleeve. FIG. 10 shows a combination elastic sleeve 22' and extension 24' formed in a single unitary assembly. The extension 24' similar to that of positioning member 24 also holds the assembly against the housing.

With the novel heat sink thermal transfer arrangement of the invention, the thermal transfer characteristics can be tailored for each specific varistor requirement.

The important requirements are that the heat be transferred away from the varistor at a rapid rate, and that the heat storage capacity of the sink disks be sufficient to prevent excessive temperature rise of the varistor.

The purpose of the elastic sleeve is to provide good thermal contact between both the varistor and the heat sink with the porcelain housing wall.

Although the heat sink thermal transfer system of the invention is described for use within arrester housings, this is by way of example only. The heat sink thermal transfer system of the invention finds application wherever zinc oxide varistors may be employed.

What we claim as new and desire to secure by Letters Patent of the United States is:

1. A voltage surge arrester comprising, in combination:

a generally cylindrical housing;

terminals mounted at opposed ends of said housing;

a plurality of zinc oxide disks, each disk having electrodes situated on opposed faces thereof; and a plurality of heat sinks, each formed of an alloy of iron and having a volume equal to at least 25 percent of the volume of said individual disks and a thermal capacity at least equal to said individual disks, said disks and heat sinks being arranged in alternating fashion to create a stack situated within said housing and electrically connected as a serial array between said terminals, said heat sinks being in closely coupled, thermal relation with adjacent pairs of said disks and in electrical connection with said electrodes thereof;

whereby said heat sinks rapidly absorb heat from said disks to effectively limit the temperature rise thereof during the conduction of current therethrough under surge voltage conditions.

2. The arrester defined in claim 1, wherein said heat sinks are formed of steel.

3. The arrester defined in claim 1 which further includes plural insulative sleeves, each said sleeve encompassing different ones of said disks and heat sinks to retain them in thermally coupled, electrically connected, paired relation.

4. The arrester defined in claim 2, wherein said heat sinks are in the form of disks having uniform diameters substantially equal to the diameter of said zinc oxide disks.

5. The arrester defined in claim 3 or 4, wherein said heat sinks are formed of steel.

6. The arrester defined in claims 1, 2, 3, or 4, which further includes means for positioning said zinc oxide and heat sink stack in proximate, heat transfer relation with said housing.

* * * * *